Nov. 11, 1941.  A. E. LARSEN  2,262,613
ROTATIVE-WINGED AIRCRAFT
Filed Aug. 1, 1940   2 Sheets-Sheet 2

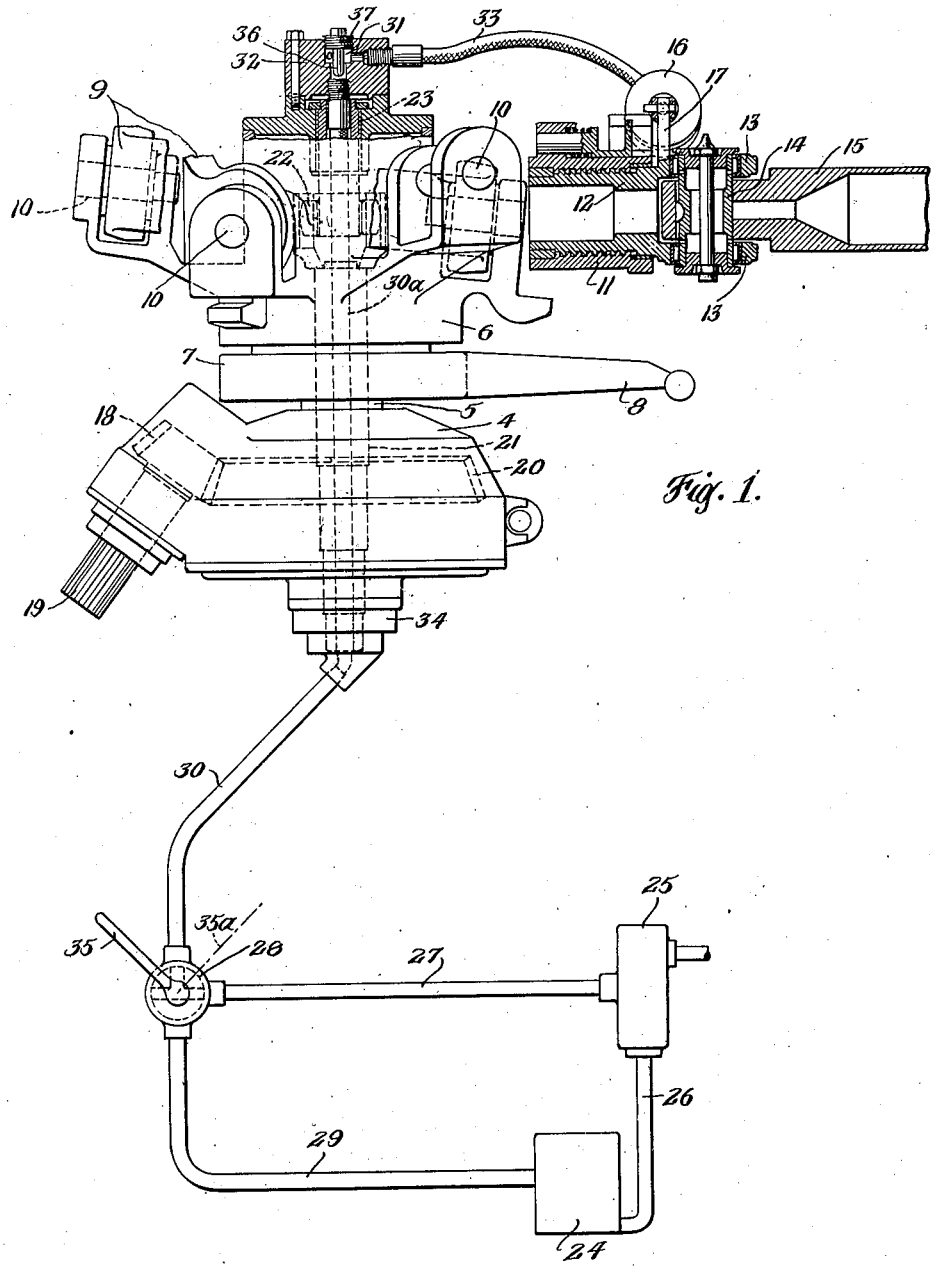

INVENTOR
Agnew E. Larsen
BY
Synnestvedt & Lechner
ATTORNEYS

Patented Nov. 11, 1941

2,262,613

UNITED STATES PATENT OFFICE 2,262,613

ROTATIVE-WINGED AIRCRAFT

Agnew E. Larsen, Jenkintown, Pa., assignor to Autogiro Company of America, Willow Grove, Pa., a corporation of Delaware Application August 1, 1940, Serial No. 349,066

9 Claims. (Cl. 244—18)

This invention relates to rotative-winged aircraft and is especially useful in rotative-winged aircraft of the type capable of effecting jump or "direct" take-off.

One known form of aircraft of the general type above mentioned is equipped with an engine driving an airscrew for inducing translational flight. Additionally, it has a sustaining rotor the blades whereof are mounted with freedom for pitch change movement and provision is made for driving the rotor for starting purposes, the drive including a disconnectible clutch. While the invention is applicable to aircraft in which the sustaining rotor may be mechanicaly driven during take-off and/or flight, it is particularly useful in a machine of the general class here under consideration in which the rotor is intended to be autorotationally actuated in normal translational flight.

To effect the jump take-off maneuver, the rotor blade pitch angle is reduced, preferably to zero, and the rotor drive clutch is engaged while on the ground so as to drive the rotor up to a substantial speed, usually higher than the normal autorotational speed of flight. The rotor drive clutch is then disconnected and the blade pitch increased so as to convert into a lifting thrust the kinetic energy stored in the rotor, and thereby cause the machine to rise vertically or substantially vertically from the ground. Translational flight follows under the influence of the propulsive airscrew, and at this time (in the particular type of machine mentioned) the rotor is kept in motion by the autorotative action of the relative airflow in flight.

One of the most important objects of the invention has reference to the conversion from the condition of direct or vertical take-off to the condition of translational flight of the aircraft. In accordance with the invention, that conversion is effected in a manner which avoids loss of altitude secured as a result of the direct take-off maneuver.

More specifically, the invention contemplates relatively gradual or slow pitch increase during the direct take-off, the result being prolongation of the period of conversion of kinetic energy to lift. This affords sufficient time in which to develop airscrew thrust adequate to initiate translational flight prior to the loss of any appreciable altitude at the top of the jump.

An example of the type of mechanism to which the present invention is particularly adapted is disclosed in copending application of James G. Ray, Serial No. 91,838, filed July 22, 1936, now Patent 2,216,163, issued October 1, 1940. As disclosed in said application, each blade is mounted on the hub by means of a pair of cooperating threaded members positioned axially of the blade and having a thread angle such that radially outward movement of the blade causes the blade to increase its pitch, radially inward movement being accompanied by decrease of blade pitch.

To offset direct take-off, a hydraulic piston and cylinder device is associated with each blade mounting and arranged so that admission of fluid pressure into the cylinder moves the blade on its threaded mounting to a reduced pitch position, preferably zero pitch. This pitch is maintained during drive of the rotor on the ground in preparation for take-off. When the desired speed of rotation of the rotor is attained, the rotor drive is disconnected and the pressure in the pitch controlling cylinders is relieved, in consequence of which the action of centrifugal force tending to move the blade radially away from the hub causes the blade to move on its threaded mounting to a position of increased pitch, whereupon the machine is caused to rise substantialy vertically from the ground.

In accordance with the invention, provision is made for retarding the relief of the fluid pressure in the pitch controlling cylinders. In this way the period of conversion of kinetic energy to lift is prolonged.

The invention also contemplates arrangement of certain parts of the hydraulic control system so as to ensure uniformity of pitch increase as between blades during the direct take-off maneuver.

Still further, the invention has in view the provision of adjustable means whereby the rate of relief of the fluid pressure may be varied, thereby providing for controlled variation of the rate of conversion of kinetic energy to lift, which is one of the primary factors determining the character of the direct take-off.

How the foregoing objects and advantages are achieved will appear more fully from the following description referring to the accompanying drawings, in which—

Figure 1 is an elevational view of a rotor hub incorporating the invention, with parts in vertical section, and with a somewhat diagrammatic illustration of a hydraulic control system associated therewith;

Figure 3:
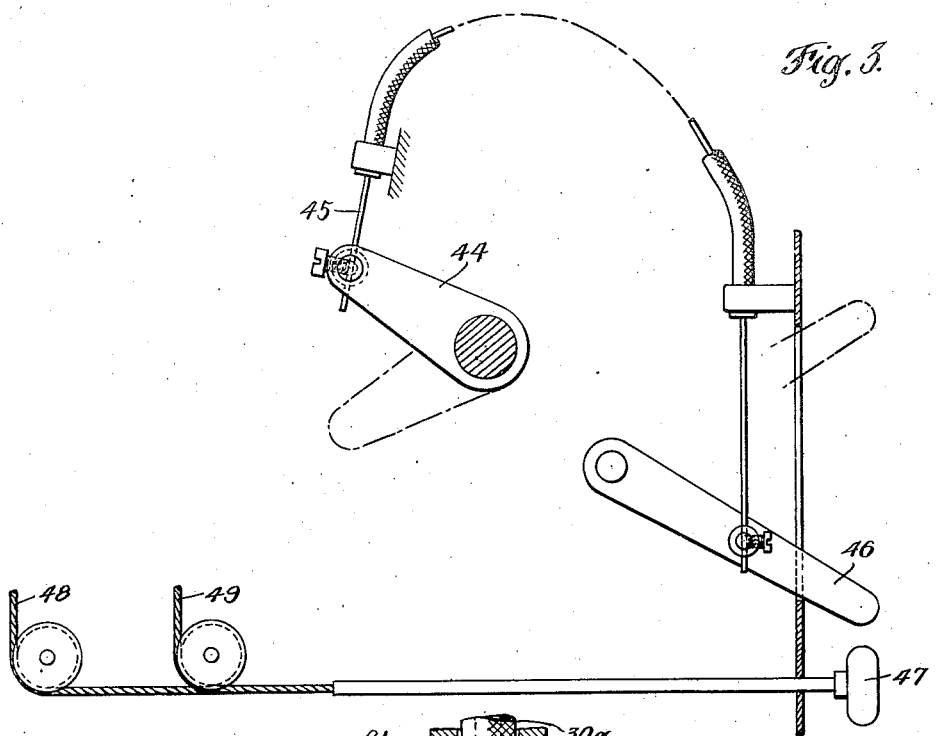
Figure 3 is a somewhat diagrammatic view illustrating features of a control system applicable to the arrangement of Figure 2, part of this view being taken on the line 3—3 of Figure 2.

In considering the following description, it should be kept in mind that the invention may be employed in an aircraft having any number of sustaining rotors, which rotors incorporate any number of aeroform blades mounted for pitch change movement. Moreover, while as above indicated, the invention is particularly adaptable to an aircraft of the type in which the sustaining rotor is normally autorotationally actuated in flight and in which the rotor drive is normally employed only for the purpose of driving the rotor on the ground in preparation for direct take-off, it should be kept in mind that at least most features of the invention are also applicable to other rotative-winged aircraft, for instance aircraft of the type in which the rotor is driven during take-off and/or full flight, in which latter event some means (such as two rotors turning in opposite directions) must be employed in order to counteract the rotor driving torque.

In considering the drawings, it should still further be kept in mind that the rotor hub to which the invention is applied as shown in the drawings is, in general, the same as that illustrated and described in my copending applications Serial Nos. 238,729, filed November 4, 1938 (now Patent 2,220,109, issued November 5, 1940), and 271,841, filed May 5, 1939, to which copending applications reference may be had for those details of the hub with which the invention is not especially concerned.

The fixed hub support 4 carries the non-rotative hub spindle 5 on which the rotative hub part 6 is mounted for rotative and tilting movement, in accordance with my copending application No. 271,841. The tilt of the hub is employed for control purposes, the angle of tilt being controllable by means of a ring 7 which is journalled on the rotative hub part and which carries control arms, one of which appears at 8, which are adapted to be coupled with the control system.

As disclosed in said application, moreover, the blades are pivotally connected with the rotative hub 6 by means of forks embracing the hub (portions of which appear at 9), the forks being pivoted to the hub by flapping pivots, some of which appear at 10 in Figure 1, the flapping pivots providing axes on which the blades may move in a direction transverse to the mean rotative path of travel. The blade mounting fork for each blade carries a sleeve member 11 which is internally threaded to cooperate with the internal threaded member 12, having a pair of spaced apertured lugs 13—13 which cooperate with a "drag" pivot 14 to which the root end 15 of a blade is attached, this drag pivot providing freedom for lag-lead movement of the blade, i. e., movement of the blade generally within its rotative path of travel.

The sense of threading between members 11 and 12 is such that centrifugal force acting on the blade tends to rotate the blade in a direction to increase its pitch angle. For the purpose of reducing the blade pitch angle, a piston and cylinder device, indicated at 16, is mounted on the external threaded member 11 which is carried by the blade mounting fork, the piston stem of this device being connected with an arm 17 projecting upwardly from the internal threaded member 12. As disclosed in the copending applications above referred to, these parts are arranged so that admission of fluid pressure to the cylinder 16 rotates the blade in the direction to decrease its pitch angle, a suitable stop being employed preferably at the zero pitch position.

The foregoing portions of the rotor hub and blade mounting need not be considered in greater detail herein since they form no part of the present invention per se, being described and claimed in various of the copending applications above referred to.

At this point attention is also called to the fact that the rotor hub illustrated in Figure 1 further incorporates a drive mechanism of the type shown in my application No. 271,841. Briefly, that drive includes a pinion 18 mounted on shaft 19 which is journalled in a part of the fixed rotor support 4. The pinion meshes with and serves to drive a ring gear 20 which is splined to a driving shaft 21 which extends upwardly through the non-rotative hub supporting spindle 5, and is provided with a universal joint at 22, the upper end of the drive shaft being splined with the rotative hub 6, as indicated at 23. The pinion driving shaft 19 is intended to be coupled to an engine mounted in the body of the aircraft, preferably the forward propulsion engine which normally serves to drive the propulsive airscrew. The rotor drive transmission also desirably incorporates a manually disconnectible clutch and may also include an overrunning clutch.

The control system for the hydraulic pitch control devices includes a source of supply of pressure fluid, indicated at 24 in Figure 1, and a pump 25. The pump inlet connection 26 is coupled with the reservoir 24 and the outlet connection 27 extends to one port of a valve 28, which valve also has a connection 29 for release of pressure to the reservoir 24.

Connection 30 extends from the valve upwardly to the rotor hub and passes centrally therethrough as indicated at 30a, the upper end of this connection communicating with a chamber 31 formed in a block 32. A plurality of branches 33, one for each blade, serve to deliver fluid under pressure from the chamber 31 to the pitch control cylinders 16 of the several blades. The branches 33 preferably comprise flexible tubing so as to accommodate movements of the blades on their flapping pivots 10. In addition, it may here be noted that a rotative joint is provided between the connection 30 below the hub and the extension 30a thereof within the hub, such rotative joint being housed at the bottom of the hub at 34 and being of the type illustrated in Figure 2, described hereinafter.

The system as thus far described functions as follows—

Upon positioning of the hand lever 35 of valve 28 as indicated in Figure 1, pressure developed by the pump 25 is delivered through connection 30 to the chamber 31 at the top of the hub and from there through the branches 33 to the cylinders 16. The result of this is movement of the blades on their threaded mountings to the zero pitch position. This condition is maintained during drive of the rotor while on the ground in preparating for take-off. When the desired rotor R. P. M. is attained the rotor driving clutch is disconnected and the control 35 for valve 28 is moved to the dotted line position 35a in which all three of the valve connections 27, 29 and 30 are interconnected. This effects release of the pressure in the system, in consequence of which the action of centrifugal force on the blades tending to move them radially outwardly causes the blades to turn about their own longitudinal axes to a position of increased pitch, whereupon the kinetic energy stored in the rotor is converted to lift and the take-off commences.

To achieve various of the objects and advantages hereinbefore referred to, the invention contemplates use of an obstruction or metering pin 36 carried by a threaded plug 37 which serves as a closure for the chamber 31 in the block 32 at the top of the hub. The pin 36 projects into the port through which connection 30 communicates with chamber 31 and thereby restricts the effective cross sectional area or capacity of the connection 31. In consequence, the release of fluid from cylinders 16 is delayed or retarded.

Retarded relief of the pressure also retards the rate of pitch increase, in view of which the period of conversion of kinetic energy to lift is prolonged so that the thrust of the propulsive airscrew may set up translational movement of the craft during the jump and thereby avoid loss of altitude attained thereby.

In considering the above it is important to note that in accordance with the invention, the combined cross sectional area or capacity of the branches 33 is preferably somewhat greater than the restricted capacity of the connection 30. This ensures that the determining factor in rate of relief of pressure will be identical for all blades.

The arrangement of the metering pin 36 as above described permits convenient replacement thereof with a pin of different diameter, whereby to alter the rate of presure relief and blade pitch increase. With this in mind the cross sectional area or capacity of the branches 33 and of the connection 30 are preferably made at least as great as the maximum relief rate desirable for any type of take-off, so that the metering pin will, with assurance, always determine the rate of pitch increase.

In considering the foregoing hydraulic control system, it is further to be kept in mind that, if desired, the operation of valve 28 may be interlocked for conjoint operation with the rotor drive clutch. Such an interlock preferably actuates the valve to establish the pressure-on condition when the rotor clutch is engaged and the pressure-relief condition when the clutch is disconnected. An interlock of this general type appears in the copending application of James G. Ray above referred to. In addition, an interlock or common control for the rotor drive and pitch change mechanisms is described herebelow as applied to the arrangement of Figures 2 and 3.

Figure 2:
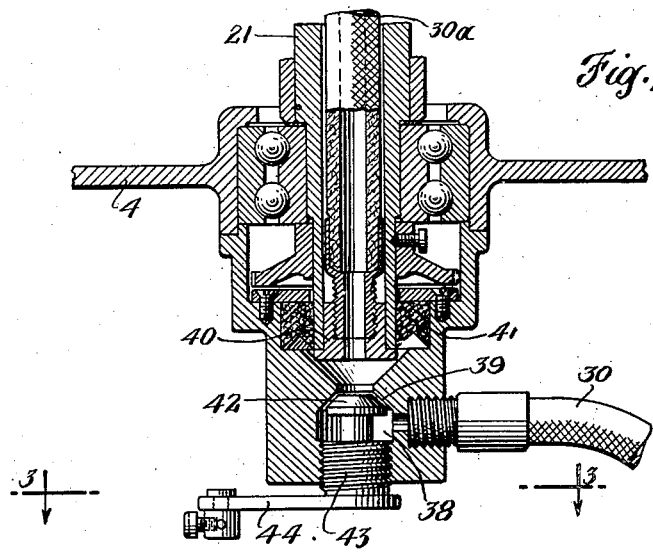
Figure 2 is a vertical sectional view of the lower portion of the hub illustrated in Figure 1, incorporating a modified form of the invention.

In Figures 2 and 3 there is shown a manually controllable valve device for controlling the rate of pressure relief. As appears in Figure 2, the connection 30 which extends upwardly from valve 28 delivers to a chamber 38 having a centrally apertured valve seat 39 establishing communication with the extension 30a which extends up through the hub for delivery of pressure to the branches 33.

It is to be understood that in accordance with the arrangement of Figure 2, it is contemplated that the metering pin 36 of Figure 1 shall be eliminated and unrestricted communication provided between connection 30a and the chamber 31. For this purpose an ordinary threaded plug (without a metering pin) may be employed to close the chamber 31.

As shown in Figure 2, the connection 30a extends through the rotor drive shaft 21, these two parts being joined at their lower ends by a flanged sleeve 40. Loss of fluid pressure is prevented by a packing 41 which surrounds the reduced terminal portion of the shaft 21.

Valve 42 is carried by the threaded part 43 which is adapted to be turned by a lever 44 so as to advance or retract the valve and thus control the opening through the valve seat 39. As shown in Figure 3, arm 44 may be actuated by a flexible connection 45 which is preferably extended to a point within reach of the pilot and there provided with a control 46.

Figure 3 also illustrates a manual control 47 to which is connected a cable 48 for operating a rotor drive clutch and a cable 49 for operating a pitch control valve. The cable 49 may be associated with a control valve such as indicated at 28 in Figure 1, and the connections 48 and 49 for the clutch and pitch change are arranged so that actuation of the common control 47 in one sense connects the rotor driving clutch and admits fluid pressure to the pitch controlling cylinders (such as shown at 16 in Figure 1) so as to reduce the blade pitch during driving of the rotor on the ground in preparation for take-off. Upon actuation of the common control 47 in the other sense, the hook-up provides for disconnection of the rotor clutch and for relief of the pitch controlling pressure, thereby resulting in increase of blade pitch at a rate determined by the setting of the control 46 which actuates valve 42.

As here shown, therefore, the pilot not only has a common control for the rotor clutch and the pitch change mechanism but, in addition, the rate of relief of pressure is placed in the hands of the pilot, which latter enables the pilot (by adjustment of control 46) to provide the type of take-off suitable to the particular conditions prevailing.

In accordance with the above, provision is made for retarded relief of the pitch controlling fluid pressure, so as to enable transition from vertical take-off to translational flight, without loss of altitude attained in the jump. In addition, the arrangement described ensures uniformity of pitch increase as between blades, and further provides for adjustment of the rate of pitch increase.

It should be kept in mind that the features of the invention fully discussed above are applicable to rotors in which pitch increase is effected by means other than the worm thread blade mounting illustrated. Thus, the invention is applicable where other automatic pitch increasing mechanism is employed, or even where pitch increase is placed in the hands of the pilot.

I claim:

1. In an aircraft having a sustaining rotor with variable pitch blades, for each blade a hydraulic device for moving the blade from a higher to a lower pitch position, means providing for movement of the blades from a lower to a higher pitch position, the rate of pitch change from a lower to a higher pitch position being determined by the rate of relief of fluid pressure from said hydraulic devices, and a fluid pressure control system including, in combination with a source of supply of fluid under pressure, fluid pressure connections between said source and said devices including a conduit connected with said source and a plurality of branches interconnecting said conduit and the hydraulic devices, and control means associated with said conduit for establishing conditions of pressure-on and pressure-relief, the cross sectional area or capacity of said conduit being restricted as compared with the combined cross sectional area or capacity of the several branches, whereby to provide uniform relief of pressure through the several branches.

2. In an aircraft having a sustaining rotor with variable pitch blades, for each blade a hydraulic device for moving the blade from a higher to a lower pitch position, means providing for movement of the blades from a lower to a higher pitch position, the rate of pitch change from a lower to a higher pitch position being determined by the rate of relief of fluid pressure from said hydraulic devices, and a fluid pressure control system including, in combination with a source of supply of fluid under pressure, fluid pressure connections between said source and said devices including a conduit connected with said source and a plurality of branches interconnecting said conduit and the hydraulic devices, and control means associated with said conduit for establishing conditions of pressure-on and pressure-relief, the cross sectional area or capacity of said conduit and of said branches being greater than that required for the desired rate of pressure-relief, and a device associated with said conduit and restricting its capacity to that required for the desired rate of pressure-relief.

3. A construction in accordance with claim 2, wherein the restricting device is associated with said conduit adjacent the junction of the branches therewith.

4. A construction in accordance with claim 2, wherein the restricting device takes the form of a replaceable metering pin, whereby the rate of relief may be adjusted by employment of metering pins of different sizes.

5. In an aircraft having a sustaining rotor with variable pitch blades, for each blade a hydraulic device for moving the blade from a higher to a lower pitch position, means providing for movement of the blades from a lower to a higher pitch position, the rate of pitch change from a lower to a higher pitch position being determined by the rate of relief of fluid pressure from said hydraulic devices, and a fluid pressure control system including, in combination with a source of supply of fluid under pressure, fluid pressure connections between said source and said devices including a conduit connected with said source and a plurality of branches interconnecting said conduit and the hydraulic devices, and control means associated with said conduit for establishing conditions of pressure-on and pressure-relief, and adjustable means for restricting the cross sectional area or capacity of said conduit as compared with the combined cross sectional area or capacity of the several branches.

6. A construction in accordance with claim 5, wherein the adjustable restricting means takes the form of a manually controllable valve in said conduit.

7. In an aircraft having a bladed sustaining rotor with a blade pitch altering system and a driving system for the rotor which may be rendered active or passive, a common control device for said systems, and an independent adjustment device for determining the rate of blade pitch change effected by said control.

8. The construction of claim 7, wherein a separate manual control for said adjustment device is provided accessible to the pilot.

9. A construction in accordance with claim 7 in which the pitch altering system includes a fluid pressure piston and cylinder device, and in which the adjustment device for determining the rate of blade pitch change includes means for throttling fluid used in said piston and cylinder device.

AGNEW E. LARSEN.

CERTIFICATE OF CORRECTION.

Patent No. 2,262,613.                                        November 11, 1941

AGNEW E. LARSEN.

It is hereby certified that error appears in the printed specification of the above numbered patent requiring correction as follows: Page 1, second column, line 9, for "offset" read --effect--; and that the said Letters Patent should be read with this correction therein that the same may conform to the record of the case in the Patent Office.

Signed and sealed this 23rd day of December, A. D. 1941.

(Seal)
                                              Henry Van Arsdale,
                                         Acting Commissioner of Patents.